(12) United States Patent
Caspari et al.

(10) Patent No.: US 12,076,672 B2
(45) Date of Patent: Sep. 3, 2024

(54) SYSTEM FOR PROVIDING A PRESSURIZED LIQUID

(71) Applicant: Airbus Operations GmbH, Hamburg (DE)

(72) Inventors: Jana Caspari, Hamburg (DE); Torsten Trümper, Hamburg (DE); Christopher Warsch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 276 days.

(21) Appl. No.: 17/587,049

(22) Filed: Jan. 28, 2022

(65) Prior Publication Data
US 2022/0241706 A1    Aug. 4, 2022

(30) Foreign Application Priority Data

Jan. 29, 2021  (DE) .......................... 102021102107.3

(51) Int. Cl.
| | | |
|---|---|---|
| *B01D 35/26* | (2006.01) | |
| *B01D 15/36* | (2006.01) | |
| *B01D 36/00* | (2006.01) | |
| *F16L 55/054* | (2006.01) | |
| *G05D 16/04* | (2006.01) | |

(52) U.S. Cl.
CPC ........... *B01D 35/26* (2013.01); *B01D 15/361* (2013.01); *B01D 36/001* (2013.01); *F16L 55/054* (2013.01); *G05D 16/04* (2013.01)

(58) Field of Classification Search
CPC .... B01D 35/26; B01D 15/361; B01D 36/001; F16L 55/054; G05D 16/04
See application file for complete search history.

(56) References Cited

U.S. PATENT DOCUMENTS

| | | | | |
|---|---|---|---|---|
| 4,008,008 | A * | 2/1977 | Vergnet | F04B 43/0072 92/92 |
| 4,806,135 | A * | 2/1989 | Siposs | B01D 36/001 96/219 |
| 5,496,468 | A * | 3/1996 | Cormier | B01D 29/58 210/172.3 |
| 6,171,718 | B1 | 1/2001 | Murach et al. | |

(Continued)

FOREIGN PATENT DOCUMENTS

| | | |
|---|---|---|
| DE | 11 2014 006218 T5 | 11/2016 |
| EP | 0 536 470 A1 | 4/1993 |

OTHER PUBLICATIONS

European Search Report for Application No. 22153381 dated May 23, 2022.

*Primary Examiner* — Tho V Duong
(74) *Attorney, Agent, or Firm* — KDW Firm PLLC

(57) ABSTRACT

A system for providing a pressurized liquid, having a reservoir for the liquid, which has a discharge and a feed, having a pump, having a first valve, having a separate filter chamber, having an inlet and at least one outlet, and a compressible, closed buffer body. The pump is between the discharge of the reservoir and the filter chamber and configured to increase pressure of the liquid within the filter chamber, the first valve between the feed of the reservoir and the filter chamber and configured to open in the direction of the reservoir upon attainment or exceedance of a minimum pressure of the liquid in the filter chamber. The buffer body is in the filter chamber such that it can be surrounded by liquid.

16 Claims, 1 Drawing Sheet

(56) References Cited

U.S. PATENT DOCUMENTS

| | | | | |
|---|---|---|---|---|
| 6,328,071 B1 * | 12/2001 | Austin | ................... | F04D 13/10 |
| | | | | 138/30 |
| 7,013,924 B1 * | 3/2006 | Meyers | .................. | F16L 55/04 |
| | | | | 220/721 |
| 2003/0222006 A1 * | 12/2003 | Cella | .................... | B01D 29/925 |
| | | | | 210/295 |
| 2010/0154467 A1 | 6/2010 | Fujimoto et al. | | |
| 2014/0317951 A1 * | 10/2014 | Kauling | .................. | C07K 1/34 |
| | | | | 210/450 |
| 2016/0036071 A1 | 2/2016 | Klewer et al. | | |

\* cited by examiner

SYSTEM FOR PROVIDING A PRESSURIZED LIQUID

CROSS-REFERENCE TO RELATED APPLICATION

This application claims priority to German Patent Application No. 10 2021 102 107.3 filed Jan. 29, 2021, the entire disclosure of which is incorporated by reference herein.

TECHNICAL FIELD

The disclosure herein relates to a system for providing a pressurized liquid, to an apparatus having a heat-generating device, and to an aircraft.

BACKGROUND

For the purpose of cooling technical apparatuses, use is made inter alia of cooling systems with a liquid coolant. Here, the coolant is provided from a coolant source and is fed to a heat exchanger, which is in contact with the apparatus, such that, there, the coolant absorbs heat. Subsequently, after passing through a suitable heat-releasing apparatus, the liquid is fed back to the coolant source. As a result of non-uniform changes in temperature of the liquid, changes in density or volume can be expected, which changes in density or volume have to be compensated in a closed cooling circuit. This can be achieved for example by way of an expansion tank arranged in the cooling circuit.

Known expansion tanks have a container with a diaphragm. One part of the volume of the container is filled with gas and extends as far as the diaphragm. The liquid within the container is situated on the other side of the diaphragm. The gas ensures a minimum pressure in the cooling system, and the expansion tank allows changes in volume to be compensated very easily.

However, in the case of cooling of fuel cells or other sensitive apparatuses, a maximum pressure of the coolant is limited. The technical realization of such a limitation would however necessitate a very large expansion tank, which is to be avoided specifically in the case of a compact design. With known expansion tanks, in particular when used for fuel cells used in means of transport, simultaneous limitation of a maximum pressure and minimization of a structural space is not possible.

SUMMARY

It is an object of the subject matter herein to disclose a system for providing a pressurized liquid, in the case of which system a minimum pressure can be ensured and a static pressure can be minimized through changing of density, wherein at the same time the structural space should be as compact as possible.

The object is achieved by a system disclosed herein. Advantageous embodiments and refinements are disclosed herein.

What is proposed is a system for providing a pressurized liquid, having a reservoir for accommodating the liquid, which has a discharge and a feed, having a pressure-increasing device, having a first valve, having a separate filter chamber, which has an inlet and at least one outlet, and having a compressible, closed buffer body, wherein the pressure-increasing device is coupled to the filter chamber and is configured to increase a pressure of the liquid within the filter chamber, wherein the first valve is arranged between the feed of the reservoir and the filter chamber and is configured to open in the direction of the reservoir upon attainment or exceedance of a minimum pressure of the liquid in the filter chamber, and wherein the buffer body is arranged in the filter chamber such that it can be surrounded by liquid.

The reservoir is to be understood as being an independent container with a specific accommodating volume. The liquid can enter the accommodating volume via the feed and can leave the accommodating volume again by way of the discharge. The reservoir is not closed in a pressure-tight manner, and so it can very easily accommodate a variable amount of liquid. A residual volume of the reservoir is filled with air, wherein the residual volume is preferably in fluid contact with the surroundings of the reservoir, in order to permit rapid inflow and outflow. The reservoir could be connected to the system at other positions too.

The filter chamber is to be understood as being an at least substantially closed container. Liquid can enter the filter chamber via the inlet and can flow out again from the at least one outlet in order to perform cooling tasks or something else. The filter chamber may have a device for filtering foreign matter out of the liquid, as will be explained in detail further below.

The pressure-increasing device may be in the form of a pump which can remove liquid from the reservoir via the discharge, and which conveys the liquid into the filter chamber and can thus increase the pressure in the filter chamber. As an alternative to this, it is also possible for another medium to increase the pressure in the reservoir, for example pressurized air, which can be provided from a corresponding source in a vent opening of the reservoir. The source could for example be an air supply system for a fuel cell. For the purpose of limiting the pressure, provision is made of the first valve, which opens at a predefined minimum pressure and allows liquid to flow from the filter chamber back into the reservoir. The minimum pressure is predefined in such a way that the intended cooling application is reliably performed even at a sensitive apparatus without a predefined pressure being exceeded. The first valve could comprise a check valve, a controllable valve in combination with a pressure sensor, or a similar valve construction.

The buffer body in the filter chamber is compressed by the pressure of the liquid that acts thereon, so that its volume is reduced with increasing pressure. Consequently, the free volume in the filter chamber that can be taken up by the liquid is increased with increasing pressure, with the result that pressure peaks and other pressure variations can be avoided in a highly effective manner. The buffer body buffers or evens out the pressure in the filter chamber even in the case of different volume flows above the inlet and the at least one outlet and over various operating states of the pressure-increasing device.

The use of the separate filter chamber, which can preferably already be provided for the filtering function in a cooling circuit anyway, allows the use of a volume already present, albeit provided normally only for filtering, for compensating changes in density of the liquid without an overall increase in the structural space of the cooling system or of some other application. An optimized configuration of the volume of the reservoir would even make it possible to achieve a reduction in the total structural space.

In an advantageous configuration, the filter chamber comprises a filter insert having a perforated filter wall which extends at a distance from a outer wall of the filter chamber. The filter insert is consequently formed substantially by a filter wall which extends at a predetermined distance from an outer wall of the filter chamber and which is permeable to the liquid. The distance between the outer wall and the filter wall could be dimensioned in such a way that, between the two, there remains a gap in which liquid can spread out in an unhindered manner and, from there, can easily flow through the filter wall. The hole fraction of the perforation of the filter wall is preferably selected in such a way that the filter insert results in the lowest possible additional flow resistance. The perforation openings may have an opening width in the micrometer range.

The inlet of the filter chamber preferably opens out in the interior of the filter insert, wherein the at least one outlet is arranged in the outer wall of the filter chamber. Liquid which gets into the filter chamber via the inlet consequently flows directly into the filter insert. However, liquid flowing out of the filter chamber flows out from a gap between the filter insert and the outer wall and has consequently been filtered by the filter wall.

In an advantageous embodiment, a filter cartridge is arranged in the filter chamber in a region which is directed away from the inlet. By way of the filter cartridge, additional receiving or collecting of particles and other foreign matter can be achieved. The filter cartridge may be placed in such a way that liquid flowing into the filter chamber gets to the filter cartridge so as to exit again there in a filtered state. The filter cartridge could be arranged for example directly opposite the inlet, for example in the region of a base of the filter chamber, while the inlet may be arranged on a top side of the filter chamber. The filter cartridge may be provided as an exchangeable element separately or together with the filter insert.

It is preferable for the filter cartridge to have an ion exchange resin. This is a material which serves as a medium for ion exchange. It is realized as an insoluble matrix, which is for example in the form of small microspheres composed of an organic polymer substrate. The microspheres are preferably porous and have a large surface on which and in which trapping of ions together with accompanying release of other ions takes place.

In a further advantageous configuration, the buffer body is arranged in the filter chamber outside the filter insert. The buffer body is consequently not impinged on directly by a liquid flow. It is possible for there to be formed between the filter insert and the outer wall of the filter chamber a suitable region in which the buffer body may be arranged. This space is in this case preferably to be dimensioned in such a way that, even for ambient pressure and the consequently largest volume of the buffer body, the latter can be freely arranged in the space.

The system may furthermore have an air separator which is arranged on an upper end of the filter chamber and which is configured to guide air outward from the filter chamber. The air separator is provided for guiding air outward from the filter chamber. With the pressurization of the liquid and the flow conditions to be found there, the presence of small air bubbles in the liquid cannot be ruled out. The small air bubbles can rise upward counter to the force of gravity in the filter chamber and, there, land in the air separator. They can be guided outward therefrom.

Particularly preferably, the first valve is connected to the air separator. The small air bubbles therefore get into the reservoir from the air separator through the first valve, and in the reservoir likewise rise upward counter to the force of gravity and accumulate in the residual volume of the reservoir or, from there, exit into the surroundings. For the targeted expulsion of small air bubbles, provision may be made for the pressure-increasing device to be operated even at a sufficient pressure in the filter chamber, so that the pressure is increased to such an extent that the first valve opens. Air is then guided outward in a target manner via the air separator.

An air filter could be situated at an opening of the air separator, and/or of the reservoir, in order to avoid particles entering from the outside.

In a further advantageous embodiment, the inlet is arranged in an upper delimiting surface of the filter chamber and is directed into a center of the filter chamber. The upper delimiting surface is also referred to as top side further below. By way of this arrangement, the inflowing liquid can be slowed down, and filtered through the filter chamber over a large area.

It is advantageous for the inlet to be connected to an inlet line, wherein a bypass line is connected to the inlet line. The bypass line could be used for temperature regulation. For example, in a cooling circuit, provision may be made of a heat exchanger via which heat is released to the outside from the cooling circuit. Via a bypass, the heat exchanger may be bypassed by a part of the flow, for example in order to increase a temperature in the cooling circuit or to temporarily reduce the transporting away of heat. This may be particularly expedient if the system is coupled to a cooling system for a fuel cell and the fuel cell has to be started up and brought to an operating temperature.

A bypass line could however also be connected separately and directly to a delimiting surface of the filter chamber and, there, open out in a corresponding opening.

In an advantageous embodiment, the pressure-increasing device is connected to the inlet line. For this reason, the filter chamber requires no additional inlet for the direct connection of the pressure-increasing device, but rather all the liquid sources can be led collectively into the filter chamber via a single inlet.

The buffer body could have an elastic sleeve which surrounds a gas volume. The gas volume serves as a resilient, compressible element. The sleeve could be formed from a rubber-like element.

Particularly preferably, the pressure-increasing device is a pump, in particular an impeller pump. Such a pump is normally self-priming and is suitable for conveying even low-viscosity liquids. It would also be conceivable to use, beside a pump, additionally pressurized air, as described further above. A redundancy can thus be achieved.

The disclosure herein furthermore relates to an apparatus having a heat-generating device, having a heat exchanger which is coupled thermally to the heat-generating device, and having a system according to the description above, wherein the system is connected to the heat exchanger such that liquid is provided by the system and can be conveyed through the heat exchanger. The heat-generating device could be in particular a fuel-cell system having one or more fuel-cell stacks with individual fuel cells, which have a multiplicity of coolant channels. These may be arranged in bipolar plates or directly adjacent thereto and are flowed through from the system by the liquid in the form of a coolant. For this purpose, provision is made of a conveying pump which is connected to the at least one outlet.

Finally, the disclosure herein relates to an aircraft having at least one apparatus mentioned above and/or having a system mentioned above.

BRIEF DESCRIPTION OF THE DRAWINGS

Further features, advantages and possible uses of the disclosure herein emerge from the description below of the example embodiments and the figures. Here, all of the features described and/or illustrated in the figures form the subject matter of the disclosure herein individually and in any desired combination, even independently of the combination of the features in the individual claims or the back-references thereof. Furthermore, in the figures, the same reference signs are used for identical or similar objects.

DETAILED DESCRIPTION

Figure 1:
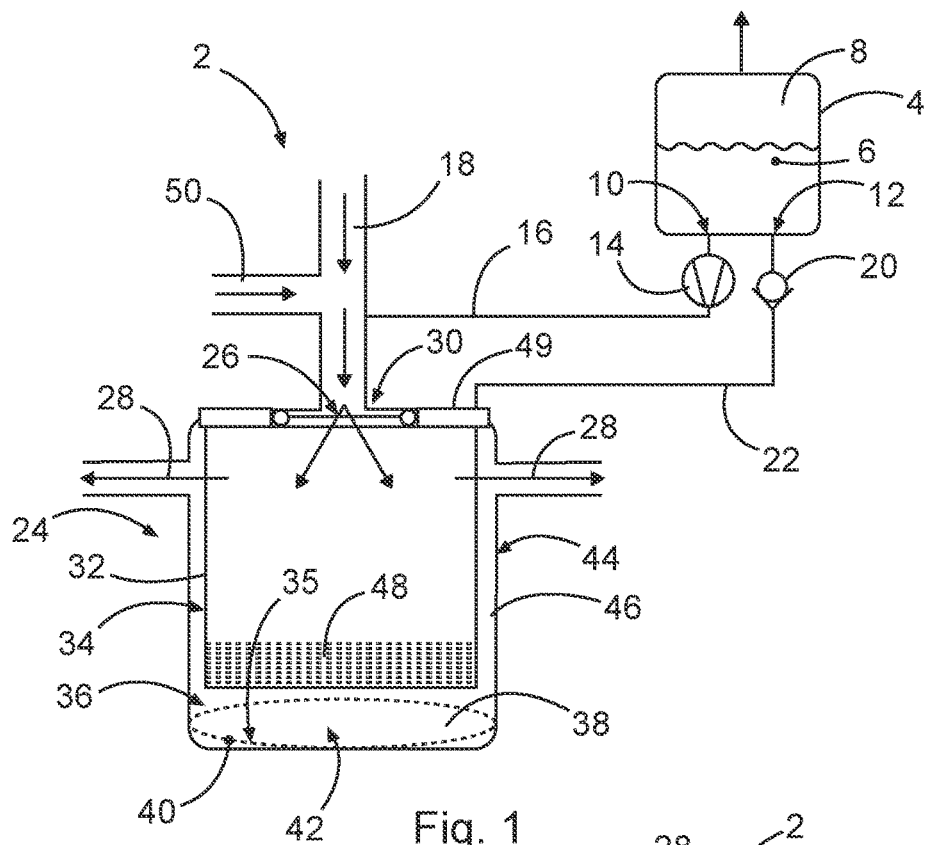
FIG. 1 shows a schematic illustration of the system according to the disclosure herein.

FIG. 1 shows a system 2 for providing a pressurized liquid. The system 2 has a reservoir 4 for accommodating the liquid. In this illustration, the reservoir 4 is filled with a liquid volume 6, while a residual volume 8 is filled with air. A discharge 10 and a feed 12 are arranged on a bottom side of the reservoir 4. Liquid can flow into the reservoir 4 through the feed 12. Removal from the reservoir 4 again is possible via the discharge 10.

An impeller pump 14 is arranged at the discharge 10 as a pressure-increasing device and is configured to remove liquid from the reservoir 4 and to convey it into a feed line 16 which is connected to an inlet line 18. A first valve 20 is arranged at the feed 12 and is configured to open in the direction of the reservoir 4 from a specific pressure. The first valve is connected to a discharge line 22.

The system 2 furthermore has a filter chamber 24, which has an inlet 26 and, by way of example, two outlets 28. The inlet 26 is connected to the inlet line 18. The inlet line 18 opens out, in this illustration, centrally and vertically with respect to a top side 30 in the filter chamber 24, with the result that liquid is directed from the inlet line 18 in the direction of a center of the filter chamber 24. In this way, the inflow speed of the liquid is reduced.

A filter insert 32 having a filter wall 34 is arranged in the filter chamber 24. The filter wall is perforated and extends from the top side 30 of the filter chamber 24 as far as a specific height above a base surface 35 of the filter chamber 24, so that an intermediate space 36 below the filter insert 32 remains free. A buffer body 38 is arranged in the intermediate space and has an elastic sleeve 40 which surrounds a gas volume 42. The filter chamber 24 has an outer wall 44 which, together with the outer wall 34 of the filter insert 32, encloses a gap 46. Liquid which gets into the filter insert 32 through the inlet 26 is fed to the outlets 28 through perforation openings in the filter wall 34.

A filter cartridge 48 having an ion exchange resin is arranged on a bottom side of the filter insert 32. Liquid can flow through the filter cartridge 48 such that particles are collected there.

An air separator 49 is arranged on the top side 30 of the filter chamber 24. The air separator could be an annular collecting container which is open at least regionally in the direction of the base surface 35. Small air bubbles present in the filter chamber 24 and migrating to the top side 30 under the action of gravitational force pass into the air separator 49. The latter is connected to the discharge line 22 and access into the reservoir 4 via the first valve 20 is consequently possible. If the impeller pump 14 is operated, the pressure within the filter chamber 24 is increased. Upon attainment of a specific pressure, the first valve 20 opens, so that the pressure in the filter chamber 24 is limited in this way. Consequently, it is possible to ensure a maximum pressure within the filter chamber 24. The opening of the first valve 20 can however also remove from the filter chamber 24 the air collected in the air separator. It is conceivable to connect the impeller pump 14 to a control unit (not shown), which increases pressure at predefined times in order to thus remove the air in a targeted manner in each case.

The inlet line 18 is furthermore connected to a bypass line 50, through which relatively warm liquid gets into the inlet line 18 and thus the inlet 26. This may be used for improving temperature regulation.

Figure 2:
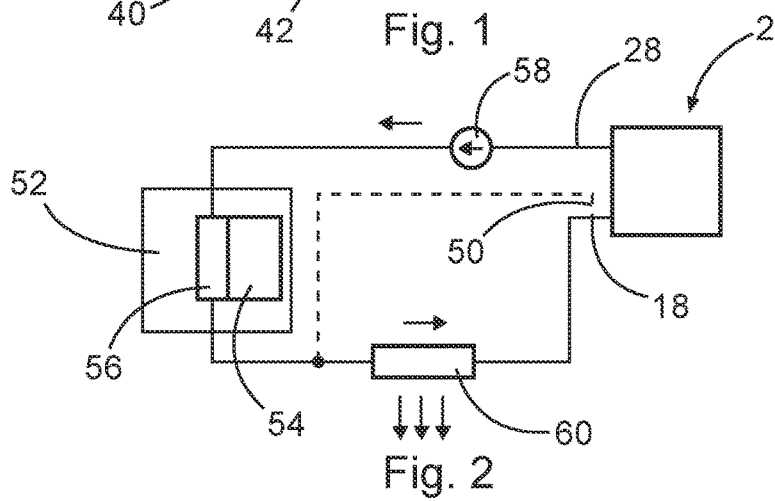
FIG. 2 shows a schematic view of an apparatus with a heat-generating device, which is coupled to the system according to the disclosure herein.

FIG. 2 shows an apparatus 52 with a heat-generating device 54, wherein a heat exchanger 56 is coupled to the heat-generating device 54. A conveying pump 58 conveys the liquid from one or both of the outlets 28 of the system 2 through the heat exchanger 56 such that, there, the liquid absorbs heat of the apparatus 52. Further on, the heated liquid flows through a heat-releasing device 60, where it can release heat to the surroundings. Then, the liquid flows back into the inlet line 18 of the system. If it is desired to bring the device 54 to an operating temperature and then, by way of cooling, to maintain the operating temperature, the heat-releasing device can be bypassed at least partially by way of a connection to the bypass line 50. The corresponding connecting line is shown by dashed lines. Provision could be made there of a controllable second valve and possibly a check valve. The device 54 could for example be a fuel-cell system.

Figure 3:
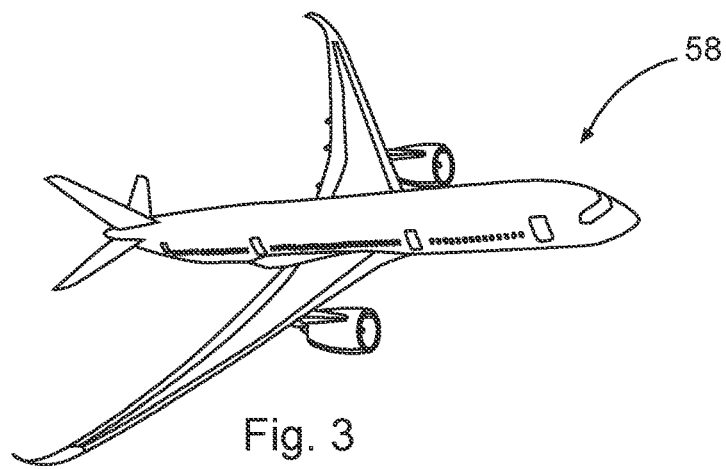
FIG. 3 shows an aircraft.

FIG. 3 shows an aircraft 62 in which an apparatus 52 as shown in FIG. 2 and/or a system 2 as shown in FIG. 1 are arranged.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS

2 System
4 Reservoir
6 Liquid volume
8 Residual volume
10 Discharge
12 Feed
14 Pressure-increasing device/impeller pump
16 Feed line
18 Inlet line
20 First valve
22 Discharge line
24 Filter chamber
26 Inlet
28 Outlet
30 Top side/upper delimiting surface
32 Filter insert 34 Filter wall
35 Base surface
36 Intermediate space
38 Buffer body
40 Elastic sleeve
42 Gas volume
44 Outer wall
46 Gap
48 Filter cartridge
49 Air separator
50 Bypass line
52 Apparatus
54 Heat-generating device
56 Heat exchanger
58 Conveying pump
60 Heat-releasing device
62 Aircraft

The invention claimed is:

1. A system for providing a pressurized liquid, having:
a reservoir for accommodating the liquid, which has a discharge and a feed;
a pressure-increasing device;
a first valve;
a separate filter chamber, which has an inlet and at least one outlet; and
a compressible, closed buffer body,
wherein the pressure-increasing device is coupled to the filter chamber and is configured to increase a pressure of the liquid within the filter chamber,
wherein the first valve is between the feed of the reservoir and the filter chamber and is configured to open in a direction of the reservoir upon attainment or exceedance of a minimum pressure of the liquid in the filter chamber, and
wherein the buffer body is in the filter chamber such that the buffer body can be surrounded by liquid.

2. The system of claim 1, wherein the filter chamber comprises a filter insert having a perforated filter wall which extends at a distance from an outer wall of the filter chamber.

3. The system of claim 2, wherein the inlet of the filter chamber opens out in an interior of the filter insert, and the at least one outlet is in the outer wall of the filter chamber.

4. The system of claim 1, wherein a filter cartridge is in the filter chamber in a region which is directed away from the inlet.

5. The system of claim 4, wherein the filter cartridge has an ion exchange resin.

6. The system of claim 2, wherein the buffer body is in the filter chamber outside the filter insert.

7. The system of claim 1, comprising an air separator on an upper end of the filter chamber and configured to guide air outward from the filter chamber.

8. The system of claim 7, wherein the first valve is connected to the air separator.

9. The system of claim 1, wherein the inlet is in an upper delimiting surface of the filter chamber and is directed into a center of the filter chamber.

10. The system of claim 1, wherein the inlet is connected to an inlet line, and wherein a bypass line is connected to the inlet line.

11. The system of claim 10, wherein the pressure-increasing device is connected to the inlet line.

12. The system of claim 1, wherein the buffer body has an elastic sleeve which surrounds a gas volume.

13. The system of claim 1, wherein the pressure-increasing device is a pump or is an impeller pump.

14. An apparatus having a heat-generating device, having a heat exchanger coupled thermally to the heat-generating device, and having the system of claim 1, wherein the system is connected to the heat exchanger such that liquid can be provided by the system and conveyed through the heat exchanger.

15. An aircraft having at least one apparatus of claim 14.

16. An aircraft having at least one system of claim 1.

* * * * *